(12) United States Patent
Torrini et al.

(10) Patent No.: US 11,784,671 B2
(45) Date of Patent: *Oct. 10, 2023

(54) APPARATUS FOR RECEIVER WITH CARRIER FREQUENCY OFFSET CORRECTION USING FREQUENCY INFORMATION AND ASSOCIATED METHODS

(71) Applicant: Silicon Laboratories Inc., Austin, TX (US)

(72) Inventors: Antonio Torrini, Austin, TX (US); Hendricus de Ruijter, Austin, TX (US); Yan Zhou, Spicewood, TX (US); David Trager, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,836

(22) Filed: Dec. 30, 2020

(65) Prior Publication Data

US 2022/0209808 A1 Jun. 30, 2022

(51) Int. Cl.
*H04B 1/16* (2006.01)
*H04B 1/10* (2006.01)
*H04L 27/26* (2006.01)

(52) U.S. Cl.
CPC ............ *H04B 1/16* (2013.01); *H04B 1/10* (2013.01)

(58) Field of Classification Search
CPC . H04B 1/10; H04B 1/123; H04B 1/16; H04B 1/7183; H04B 7/0452; H04B 7/0413; H04L 27/2657; H04L 27/2675; H04L 27/14; H04L 2027/0024; H04L 2027/0026; H04L 27/0014; H04L 27/2649
See application file for complete search history.

(56) References Cited

U.S. PATENT DOCUMENTS

| | | | | |
|---|---|---|---|---|
| 5,960,046 | A * | 9/1999 | Morris | H04L 25/062 370/347 |
| 7,218,691 | B1 * | 5/2007 | Narasimhan | H04L 27/2675 370/208 |
| 7,649,963 | B2 * | 1/2010 | Choi | H04L 27/2657 375/340 |
| 7,738,357 | B2 * | 6/2010 | Gaikwald | H04L 27/2675 370/208 |
| 7,813,442 | B2 * | 10/2010 | Gaikwad | H04L 5/0023 375/267 |
| 8,064,528 | B2 * | 11/2011 | Giannakis | H04B 7/0413 375/260 |

(Continued)

OTHER PUBLICATIONS

Office communication in U.S. Appl. No. 17/138,846 (15 pgs.).

(Continued)

*Primary Examiner* — Quochien B Vuong
(74) *Attorney, Agent, or Firm* — Law Offices of Maximilian R. Peterson

(57) ABSTRACT

An apparatus includes a radio-frequency (RF) receiver for receiving an RF signal using a plurality of antennas. The RF receiver includes a demodulator to provide a switch signal to cause the RF receiver to use an antenna in the plurality of antennas. The RF receiver further includes a carrier frequency offset (CFO) correction circuit that estimates and removes a carrier frequency offset.

20 Claims, 18 Drawing Sheets

(56) References Cited

U.S. PATENT DOCUMENTS

| | | | |
|---|---|---|---|
| 8,989,316 B1* | 3/2015 | Wang | H04L 27/2273 |
| | | | 375/326 |
| 9,184,971 B2* | 11/2015 | Lerner | H04L 27/2657 |
| 9,860,096 B1* | 1/2018 | Ganwani | H04W 4/33 |
| 2006/0234647 A1* | 10/2006 | Kerselaers | H04B 1/16 |
| | | | 455/73 |
| 2006/0244660 A1* | 11/2006 | Ann | H01Q 3/26 |
| | | | 342/377 |
| 2013/0202069 A1 | 8/2013 | Nilsson | |
| 2014/0179252 A1 | 6/2014 | Takagi | |
| 2014/0269389 A1* | 9/2014 | Bukkfejes | H04W 24/08 |
| | | | 370/252 |
| 2015/0126127 A1 | 5/2015 | Yang | |

OTHER PUBLICATIONS

Office communication in U.S. Appl. No. 17/138,846 (23 pgs.).
Office communication in U.S. Appl. No. 17/138,846 (18 pgs.).
Office communication in U.S. Appl. No. 17/138,846 (24 pgs.).

* cited by examiner

APPARATUS FOR RECEIVER WITH CARRIER FREQUENCY OFFSET CORRECTION USING FREQUENCY INFORMATION AND ASSOCIATED METHODS

CROSS-REFERENCE TO RELATED APPLICATIONS

This application is related to U.S. patent application Ser. No. 17/138,846, filed on Dec. 30, 2020, titled "Apparatus for Receiver with Carrier Frequency Offset Correction Using Phase and Frequency Information and Associated Methods,".

TECHNICAL FIELD

The disclosure relates generally to communication apparatus and associated methods. More particularly, the disclosure relates to apparatus for radio-frequency (RF), such as RF receivers, with carrier frequency offset (CFO) correction, and associated methods.

BACKGROUND

With advances in technology, an increasing number of circuit elements have been integrated into devices, such as integrated circuits (ICs). Furthermore, a growing number of devices, such as ICs, or subsystems, have been integrated into products. With developments such as the Internet of Things (IoT), this trend is expected to continue.

Some apparatus, such as IoT apparatus, operate at least in part wirelessly. In other words, such apparatus use radio frequency (RF) receivers (RX) and/or transmitters (TX). As persons of ordinary skill in the art understand, RF receivers typically suffer from carrier frequency offset (CFO).

FIG. 1 shows a conventional RF receiver that includes CFO estimation and removal. FIG. 2 shows details of a conventional CFO estimation circuit and a conventional CFO removal circuit. The circuitry in FIGS. 1 and 2 are known to persons of ordinary skill in the art. As such, the details of their operation is understood by persons of ordinary skill in the art and are therefore not further described here.

The description in this section and any corresponding figure(s) are included as background information materials. The materials in this section should not be considered as an admission that such materials constitute prior art to the present patent application.

SUMMARY

A variety of apparatus and associated methods for RF apparatus are contemplated according to exemplary embodiments. According to one exemplary embodiment, an apparatus includes an RF receiver for receiving an RF signal using a plurality of antennas. The RF receiver includes a demodulator to provide a switch signal to cause the RF receiver to use an antenna in the plurality of antennas. The RF receiver further includes a CFO correction circuit that estimates and removes a carrier frequency offset.

According to another exemplary embodiment, an apparatus includes an RF receiver for receiving an RF signal using a plurality of antennas. The RF receiver includes a demodulator to provide a switch signal to cause the RF receiver to use an antenna in the plurality of antennas. The RF receiver further includes a CFO estimation circuit to use the switch signal to provide an estimation of a carrier frequency offset, a phase difference removal (PDR) circuit coupled to the CFO estimation circuit, a CFO removal circuit, coupled to the CFO estimation circuit, that uses the estimation of the carrier frequency offset to remove the carrier frequency offset.

According to another exemplary embodiment, a method of correcting CFO in a radio-frequency (RF) receiver using a plurality of antennas includes using a demodulator to provide a switch signal to cause the RF receiver to use an antenna in the plurality of antennas, and using a CFO correction circuit to estimate and remove the carrier frequency offset.

BRIEF DESCRIPTION OF THE DRAWINGS

The appended drawings illustrate merely exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosure relates generally to communication apparatus and associated methods. More particularly, the disclosure relates to apparatus for RF communications, such as RF receivers, with CFO correction, and associated methods relating to such apparatus. In exemplary embodiments, CFO correction is provided for RF receivers and/or transceivers that use antenna diversity.

Antenna diversity, as known to persons of ordinary skill in the art, allows a receiver to use more than one antenna. Based on one or more criteria, such as one or more quality measures or metrics related to the signal received by the RF receiver, the RF receiver may at any given time use one antenna from among a set of antennas. As also known to persons of ordinary skill in the art, the choice of antenna for the RF receiver can change over time, for instance, in response to the changes in the one or more quality measures or metrics mentioned above.

Figure 1:
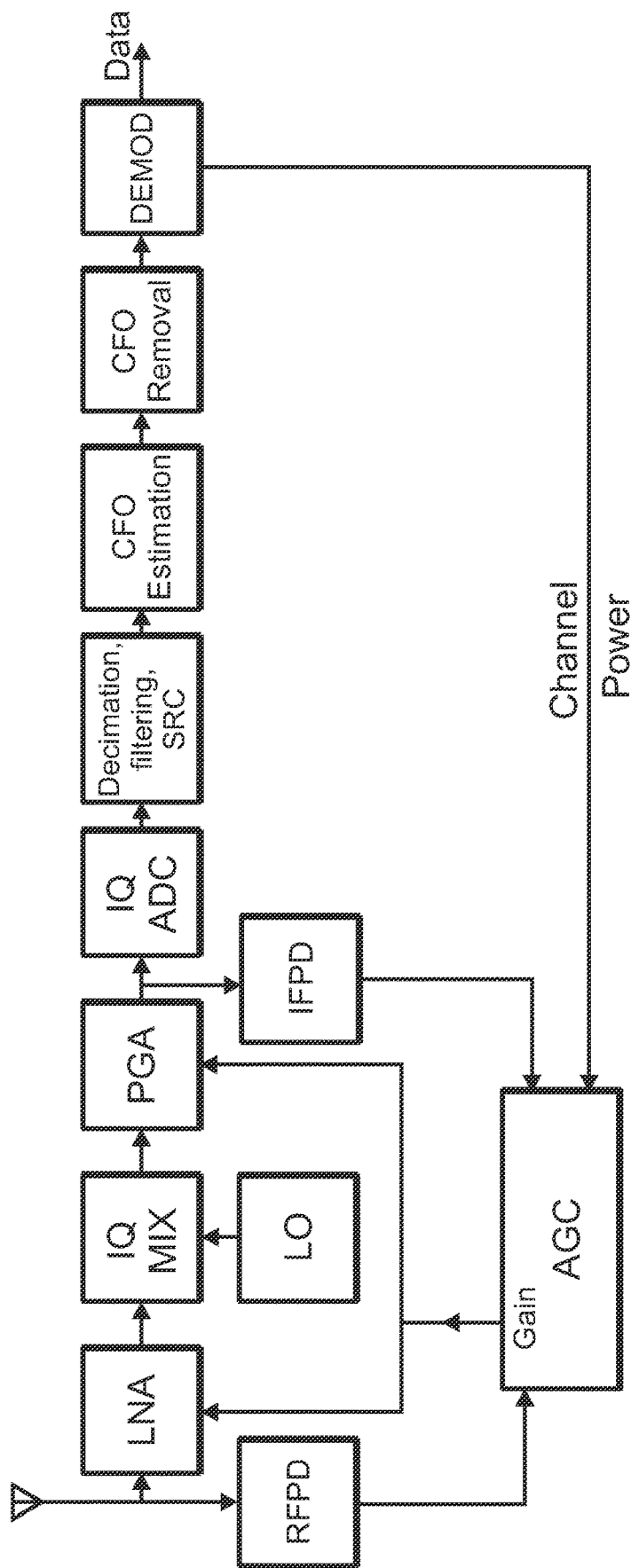
FIG. 1 shows a conventional RF receiver.
Figure 2:
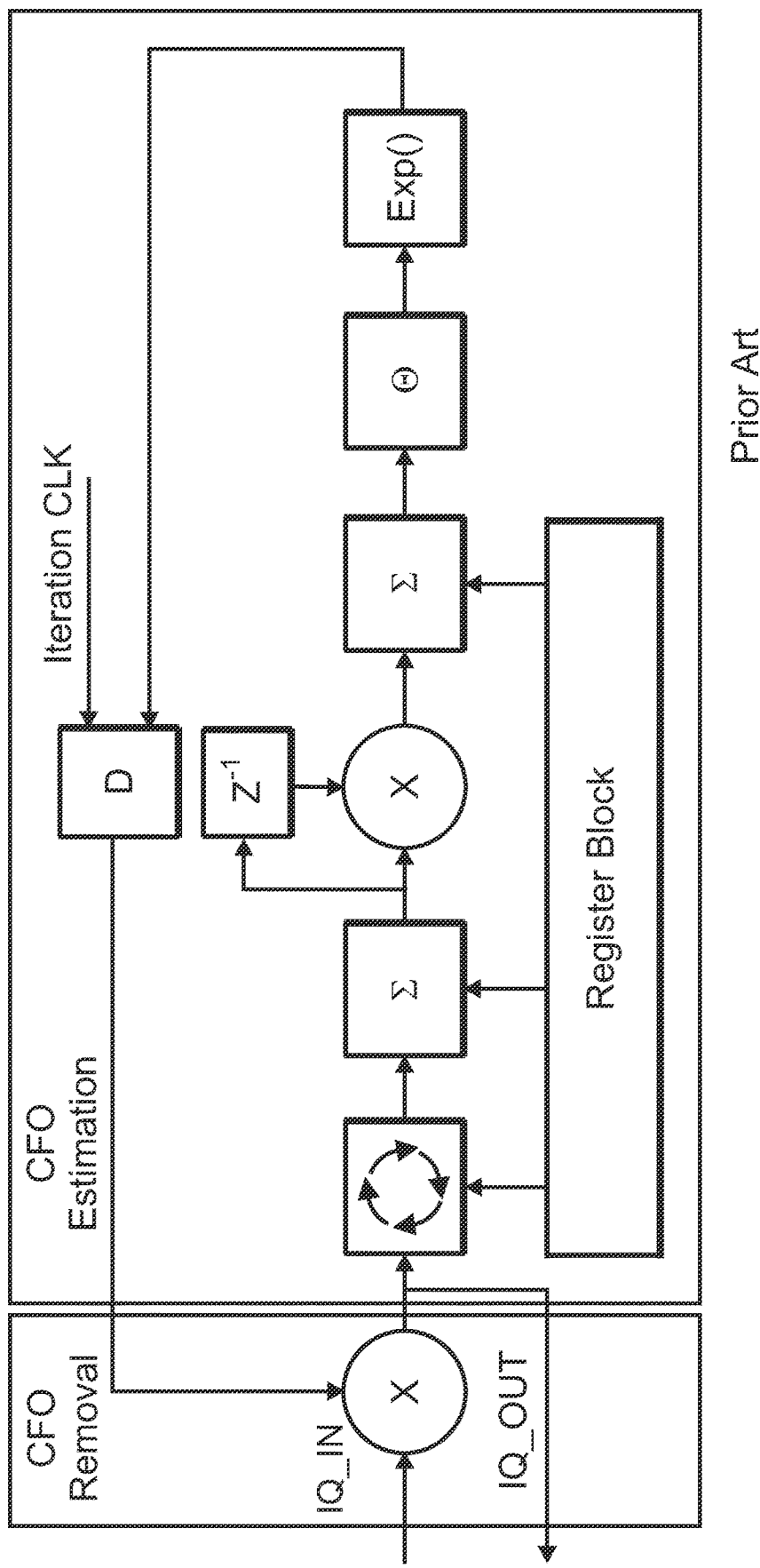
FIG. 2 shows details of conventional CFO estimation and CFO removal circuitry in the conventional RF receiver of FIG. 1.
Figure 3:
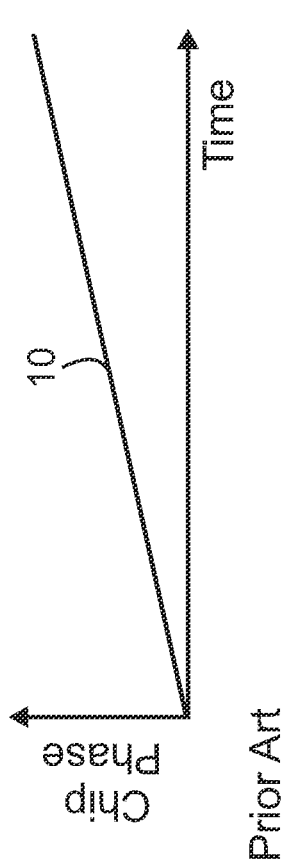
FIG. 3 shows a plot of chip phase for a receiver with no antenna diversity (single antenna).

Conventional RF receivers use a single antenna, for example, as shown in FIG. 1, i.e., they do not use antenna diversity. FIG. 3 shows a plot 10 of chip time for such a receiver. More specifically, the plot 10 shows the chip phase of the receiver as a linear function of time, with no discontinuities or "jumps." The CFO estimation and removal circuitry can take advantage of the linear phase as a function of time in a single-antenna receiver. The result is relatively straightforward CFO estimation and removal schemes.

When, however, two or more antennas are used, i.e., antenna diversity, non-contiguous "segments" of data for each antenna result in the plot of chip phase versus time. (Chips, also sometimes called samples, are constituent parts or fragments of a symbol. For example, a symbol consisting of 1010 has four chips of alternating ones and zeros.) Because of the use of multiple antennas, discontinuities are present in the function of chip (or sample) phase versus time.

Figure 4:
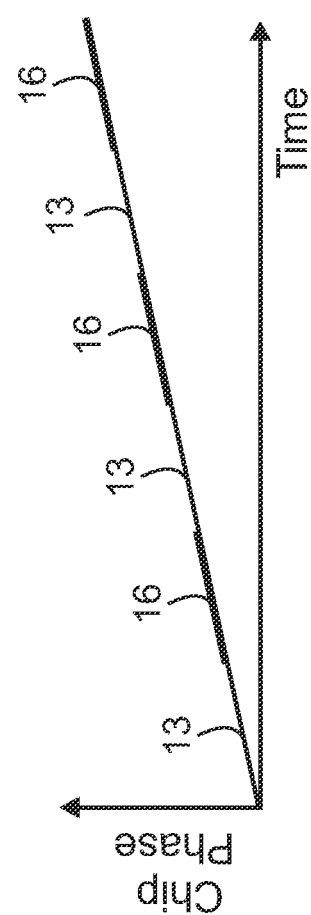
FIGS. 4-5 show plots of chip phase for an RF receiver with antenna diversity according to an exemplary embodiment.
Figure 5:
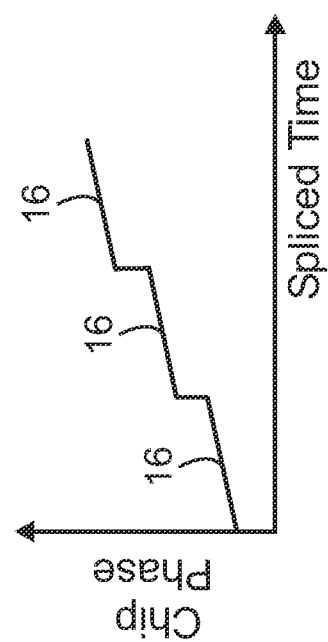

FIGS. 4-5 show plots of chip phase for an RF receiver with antenna diversity according to an exemplary embodiment. The RF receiver may, for example, constitute the RF receiver 20 in FIG. 6, which uses two antennas: antenna 23 and antenna 26. Depending on one or more measures of received signal quality, such as received signal strength indicator (RSSI), the receiver 20 may use antenna 23 or antenna 26. In other words, as the one or more measures of received signal quality using one antenna degrades, the receiver 20 switches to using another antenna, such as the antenna 26. The switching between antennas may occur multiple times as a function of time.

Referring to FIG. 4, a plot of chip phase as a function of time includes segments 13 and segments 16. The segments 13 correspond to the chip phase using one antenna (e.g., the antenna 23), and the segments 16 correspond to the chip phase using another antenna (e.g., the antenna 26). As part of CFO correction, the RF receiver 20 uses the segments from the antenna that provides better measure(s) of received signal quality.

For example, as FIG. 5 shows, the segments 16 may be used. FIG. 5 shows a plot of the chip phase, which includes the segments 16, as a function of spliced time. In other words, the segments 13 in FIG. 4 are removed, and the segments 16 are joined to arrive at the chip phase plot in FIG. 5. The splicing (removing the segments 13 and joining together the segments 16 results in the discontinuities or "jumps" in the plot of chip phase in FIG. 5. The term "antenna switch" refers to switches relative to spliced time and not normal time. In other words, in FIG. 5, there are two such switches shown which correspond to the chip phase discontinuities, i.e., the two discontinuities between the segments 16.

Given that frequency is the derivative of phase with respect to time, differences in the characteristics of the reference crystals and other non-idealities give rise to carrier frequency offsets (CFO). This phenomenon is further exacerbated when noisy phase values are present. CFO can cause a variety of undesirable outcomes. As an example, CFO can cause a +1 symbol, which ordinary is at the +1 point on the unit circle, to rotate around the unit circle. Other effects of CFO are understood by persons of ordinary skill in the art and are not discussed further.

When switching antennas in an antenna diversity receiver, multi-symbol sequences of chips are composed of multiple discontinuous intervals, as discussed above. In order to correct the CFO in this situation, in exemplary embodiments the CFO parameters are calculated relatively reliably. Ideally, CFO calculation precision would not be a limiting factor in RF receiver sensitivity. With antenna diversity, these CFO correction techniques provide a sensitivity versus frequency offset curve that is within a fraction of a decibel of the ideal non-CFO case.

Apparatus and methods according to various embodiments provide CFO correction, as discussed above. CFO correction according to exemplary embodiments is effective when the phase measurement for each in-phase (I) and quadrature (Q) sample in the RF receiver is noisy. In such circumstances, simpler schemes (e.g., those used for single-antenna systems) may fail altogether, or may not function or function well with phase locked loops (PLLs) having 20 parts-per-million (ppm) or worse accuracy or precision.

Noisy phase values tend to be pronounced in some particular applications, such as Internet of Things (IoT) apparatus (e.g., ICs) and systems. Such systems tend to have relatively stringent constraints for both power consumption and cost. Using CFO correction techniques according to various embodiments in such systems provides an advantage over conventional approaches.

In exemplary embodiments, discontinuities in phase are estimated and removed separately. Accordingly, CFO correction in such embodiments uses two separate loops instead of one loop used conventionally. The following description provides examples of such embodiments.

Figure 6:
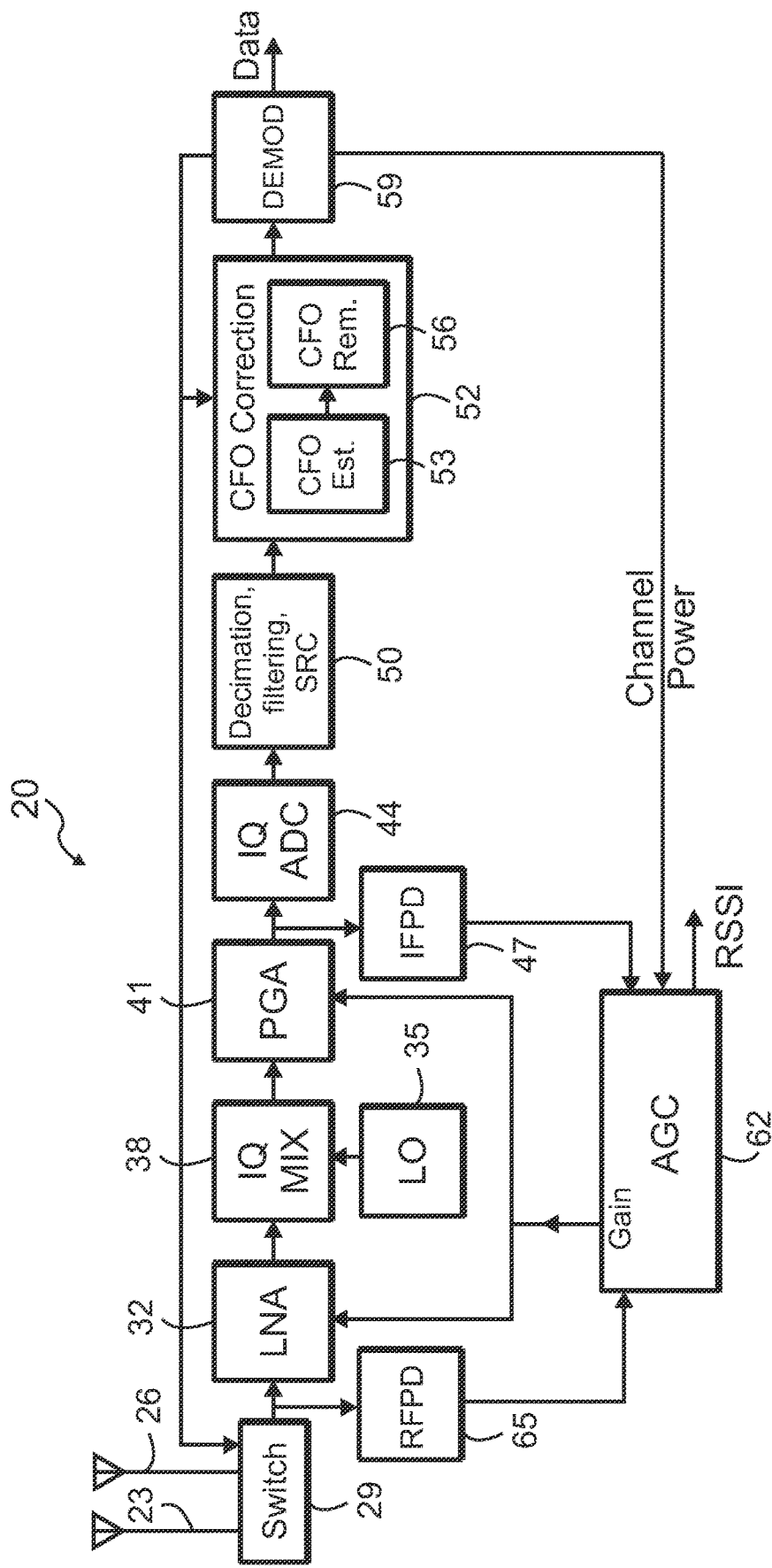
FIG. 6 shows a circuit arrangement for an RF receiver according to an exemplary embodiment.

FIG. 6 shows a circuit arrangement for an RF receiver 20 according to an exemplary embodiment. The RF receiver 20 includes CFO correction circuitry, as described below in detail. The RF receiver 20 uses two antennas 23 and 26, respectively, via the switch 29. The switch 29 is controlled by demodulator circuit 59, i.e., via a control signal provided by the demodulator 59, the switch 29 provides signals received by either the antenna 23 or the antenna 26 to the low noise amplifier (LNA) 32. The choice of antenna may be made as described above, i.e., based on one or more criteria, such as one or more quality measures or metrics related to the signal received by the RF receiver.

The LNA 32 amplifies the signal received the switch 29. The amount of amplification depends on a gain signal provided by the automatic gain control (AGC) circuit 62. The LNA 32 provides an amplified signal to the IQ mixer 38. The IQ mixer mixes the amplified signal with a local oscillator (LO) signal from LO circuit 35 to generate a down-converted signal.

The down-converted signal is provided to programmable gain amplifier (PGA) circuit 41. In response to the gain signal from the AGC circuit 62, the PGA circuit 41 amplifies the down-converted signal to generate an input signal for the IQ analog-to-digital converter (ADC) circuit 44.

The ADC circuit 44 converts the IQ signals from the PGA circuit 41 into digital IQ signals. The digital IQ signals are provided to the decimation, filtering, and sampling rate conversion (SRC) circuit 50 provides, as the name suggests, decimation, filtering, and SRC operations on the signal received from the ADC circuit 44. Details of the decimation, filtering, and SRC operations depend on factors such as design and operation specifications for a given application, cost, complexity, modulation schemes, frequency plans, etc., as persons of ordinary skill in the art will understand.

The CFO correction circuit 52 in the RF receiver 20 includes CFO estimation circuit 53 and CFO removal circuit 56. The output of the decimation, filtering, and SRC (DFS) circuit 50 fees the input of the CFO correction circuit 52. The output of the CFO estimation circuit 53 feeds the input of CFO removal circuit 56, while the output of the CFO removal circuit 56 drives the input of demodulator circuit 59 (as described below in detail).

As described below, the CFO estimation circuit 53 provides an estimation of the CFO to the CFO removal circuit 56 in response to control signals from the demodulator 59. The control signals provide the antenna or chip phase switching points (see FIGS. 4-5).

The CFO removal circuit 56 removes (or nearly removes, in a practical implementation with non-ideal circuitry, as persons of ordinary skill in the art will understand) the CFO. Put another way, one of the design goals of the CFO estimation circuit 53 and CFO removal circuit make the multi-antenna case (see FIG. 5) to appear similar to the single-antenna case (see FIG. 3).

Figure 7:
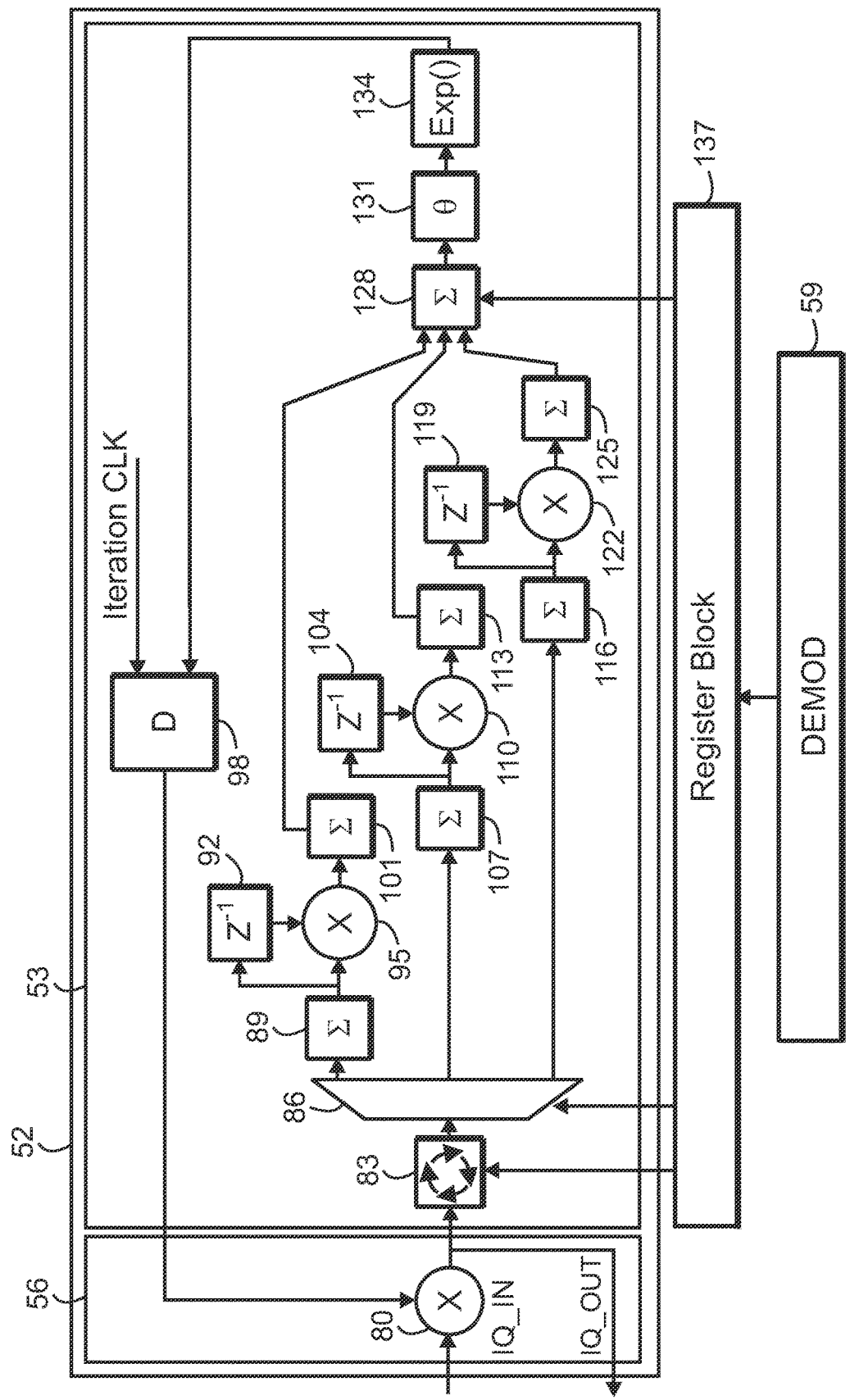
FIG. 7 shows a circuit arrangement for CFO correction according to an exemplary embodiment.

FIG. 7 shows a circuit arrangement for CFO correction circuit 52 according to an exemplary embodiment. More specifically, the figure illustrates the details of the CFO estimation circuit 53 and the CFO removal circuit 56 used in the receiver of FIG. 6. The CFO estimation circuit and the CFO removal circuit 56 make the multi-antenna case appear like a single-antenna case by removing the "jumps" or discontinuities (see, for example, FIG. 5).

Referring again to FIG. 7, the CFO removal circuit 80 includes a multiplier 80, which receives the I and Q (IQ_IN) signals, which are provided to the CFO correction circuit 52 from the decimation, filtering, and SRC (DFS) circuit 50. The multiplier 80 multiplies the output of a D-latch 98 (described below) with the IQ_IN signals to generate the output I and Q (IQ_OUT) signals. The IQ_OUT signals are provided to the demodulator 59 (see FIG. 6).

Referring again to FIG. 7, the demodulator 59 provides control signals to various blocks in the CFO correction circuit 52 via the register block 137. For example, the demodulator 59, via register block 137, provides control signals to the derotator 83, the demultiplexer (DeMUX) 86, and the averaging circuit 128. The control signals from the demodulator 59 indicate, for example, the switching points from one antenna to another, e.g., from the antenna 23 to the antenna 26 (see FIG. 6). Note that averaging refers to the sum of N elements divided by N, where N represents a positive integer greater than unity. The derotator is essentially adding/subtracting a fixed phase sequence (determined by the specification of the given wireless standard or protocol according to which the RF receiver operates) so that all chips have ideally the same phase.

Referring again to FIG. 7, the output of the multiplier 80 are fed to derotator 83 in the CFO estimation circuit 53. Disregarding CFO effects, the derotator 83 ensures that all chips have the same phase (or nearly the same phase, in a practical real-life implementation). In response to control signals from the demodulator 59 (provided via the register block circuit 137), the DeMUX 86 provides the output of the derotator 83 to either the averaging circuit 89, the averaging circuit 107, or the averaging circuit 116, depending on for which of the intervals where a particular antenna is used the CFO estimation is performed. The register block holds configuration information and control signals from the demodulator 59 and provides those signals to various blocks in the CFO estimation circuit 53.

The averaging circuit 89, the averaging circuit 107, and the averaging circuit 116 are part of three branches or loops in the CFO estimation circuit 53, each of which includes phase averaging, followed by conversion of phase to frequency, followed by frequency averaging. In the first branch, the averaging circuit 89 averages the phase output signals of the derotator 83 and provides the resulting signals to the multiplier 95.

The averaging performed by the averaging circuit 89 (and similarly by the averaging circuits 107 and 116) improve the signal to noise ratio (SNR) of the phase samples. The multiplier 95 together with delay circuit 92 provide a phase to frequency conversion. The frequency output signals of the multiplier 95 are provided to the averaging circuit 101. The averaging circuit 101 provides averaging of the frequency values and provides a CFO value, CFO1.

The second branch (phase averaging circuit 107, phase to frequency converter (multiplier 110 and delay circuit 104), and frequency averaging circuit 113 operate similarly to provide a CFO value, CFO2. Finally, the third branch (phase averaging circuit 116, phase to frequency converter (multiplier 122 and delay circuit 119), and frequency averaging circuit 125 operate similarly to provide a CFO value, CFO3.

Figure 9:
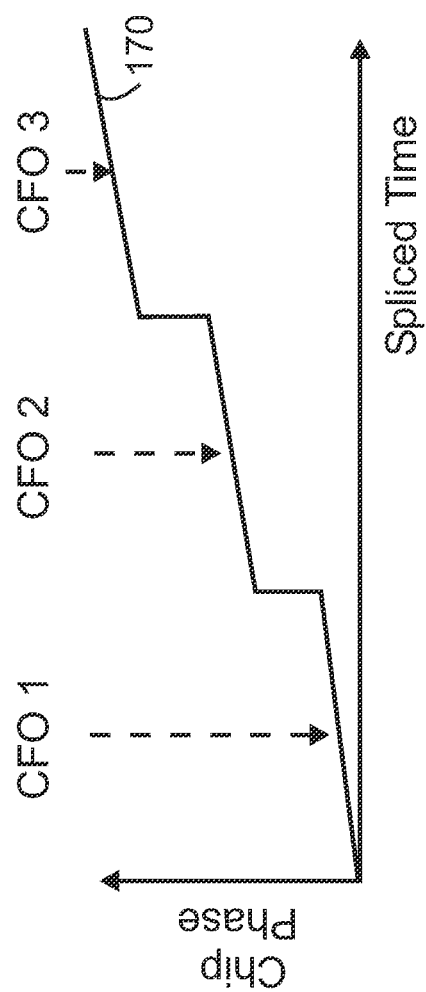
FIG. 9 shows a plot of chip phase in an RF receiver according to an exemplary embodiment.

The CFO1, CFO2, and CFO3 values, corresponding to the time periods when a particular antenna is used, are shown in FIG. 9. Referring again to FIG. 7, the number of phase and/or frequency samples are averaged by the averaging circuits in the three branches may be configured or programmed, for example, by the demodulator 59 or a controller, etc. As persons of ordinary skill in the art will understand, other numbers of circuit branches, such as two or more than three, may be used, depending on factors such as design and performance specifications, cost, target performance, target markets, etc.

The outputs of the three branches, i.e., the outputs of frequency averaging circuits 101, 113, and 123, respectively, are provided as inputs to the averaging circuit 128. Under the control of the demodulator 59, via the register block 137, the averaging circuit 128 improves the SNR of the frequency samples.

The Coordinate Rotation Digital Computer (Cordic) 131 converts the IQ samples from the averaging circuit 128 into frequency samples, and then creates IQ samples with estimated constant frequency. The exponentiation block 134 converts the phase increment received from the CORDIC 131 to a complex vector of phase increment. The exponentiation block 134 may be implemented using a CORDIC, as desired. In other words for each phase Ph the CORDIC calculates $\text{Exp}(i*Ph)=\cos(Ph)+i*\sin(Ph)$, where i is the imaginary unit or square root of $-1$. In exemplary embodiments, the exponentiation block 134 may be implemented using a CORDIC, as desired.

The output of the exponentiation block 134 (coefficients of rotation) is provided to the D-latch 98. A clock signal, labeled "Iteration CLK," clocks the latch 98 (the demodulator or a controller (not shown) may provide the clock signal to the latch 98). The output of the latch 98 is provided as an input to the multiplier 80. Before each time the latch 98 is clocked, via the register block 137, the demodulator 59 increases the level of filtering by increasing the number of averaging operations performed by the averaging circuit 128, i.e., by increasing N.

Figures 8A, 8B:
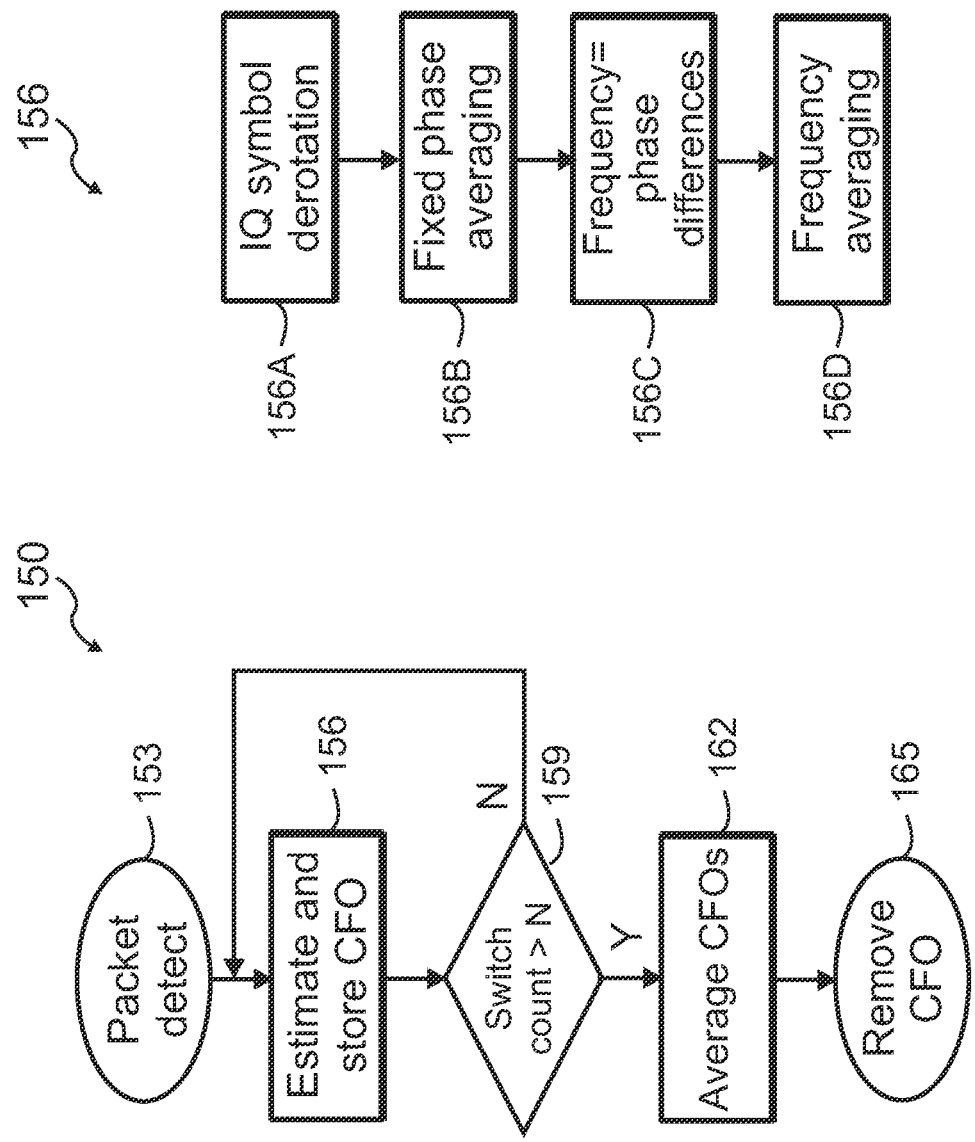
FIGS. 8A-8B show flow diagrams for a method of CFO correction according to an exemplary embodiment.

FIGS. 8A-8B show flow diagrams for a method of CFO correction according to an exemplary embodiment. More specifically, FIGS. 8A-8B illustrate flow diagrams for the exemplary embodiments of FIGS. 6-7. Referring to FIG. 8A, at 153, a packet is detected by the RF receiver (e.g., the receiver in FIG. 6). At 156, the CFO is estimated and stored (e.g., CFO1 in FIG. 9).

At 159, a check is made whether the antenna switch count exceeds a threshold, N, where N denotes a positive integer. If not, control returns to 156. If the count exceeds N, however, at 162 the CFOs are averaged, and at 165 the CFO is removed. Note that the number of antenna switches multiplied by switch time cannot exceed the preamble time. Therefore, as merely one example, in the case of the Zigbee specification, there are 8 zero symbols in the preamble. If each switch duration is 1 symbol, 8/(number of antennas) is the absolute maximum value for N, and the switch counter will determine when the loop is exited.

FIG. 8B illustrates details of estimating and storing CFO at 156 in FIG. 8A. Referring to FIG. 8B, at 156A, IQ symbol derotation is performed. At 156B, fixed phase averaging is performed. At 156C, frequency is derived from the phase samples. At 156D, frequency averaging is performed.

Figure 10:
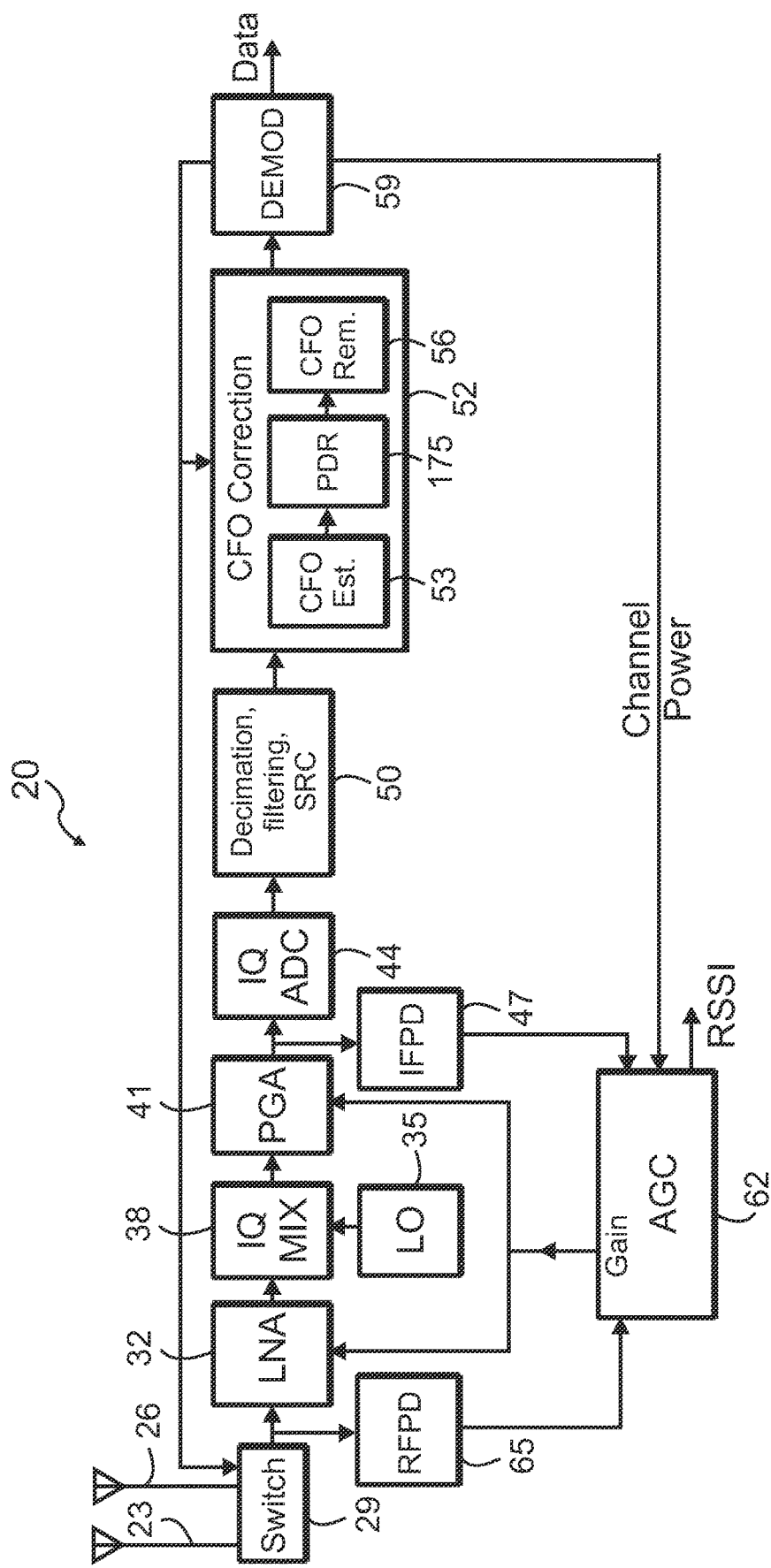
FIG. 10 shows a circuit arrangement for an RF receiver according to an exemplary embodiment.

FIG. 10 shows a circuit arrangement for an RF receiver 20 according to an exemplary embodiment. The RF receiver 20 in FIG. 10 is similar to the RF receiver 20 in FIG. 6, but differs in the CFO correction circuit 52. Referring to FIG. 10, the CFO correction circuit includes the CFO estimation circuit 53, the CFO removal circuit 56, and a phase delta removal or phase difference removal (PDR) circuit 175.

Figure 11:
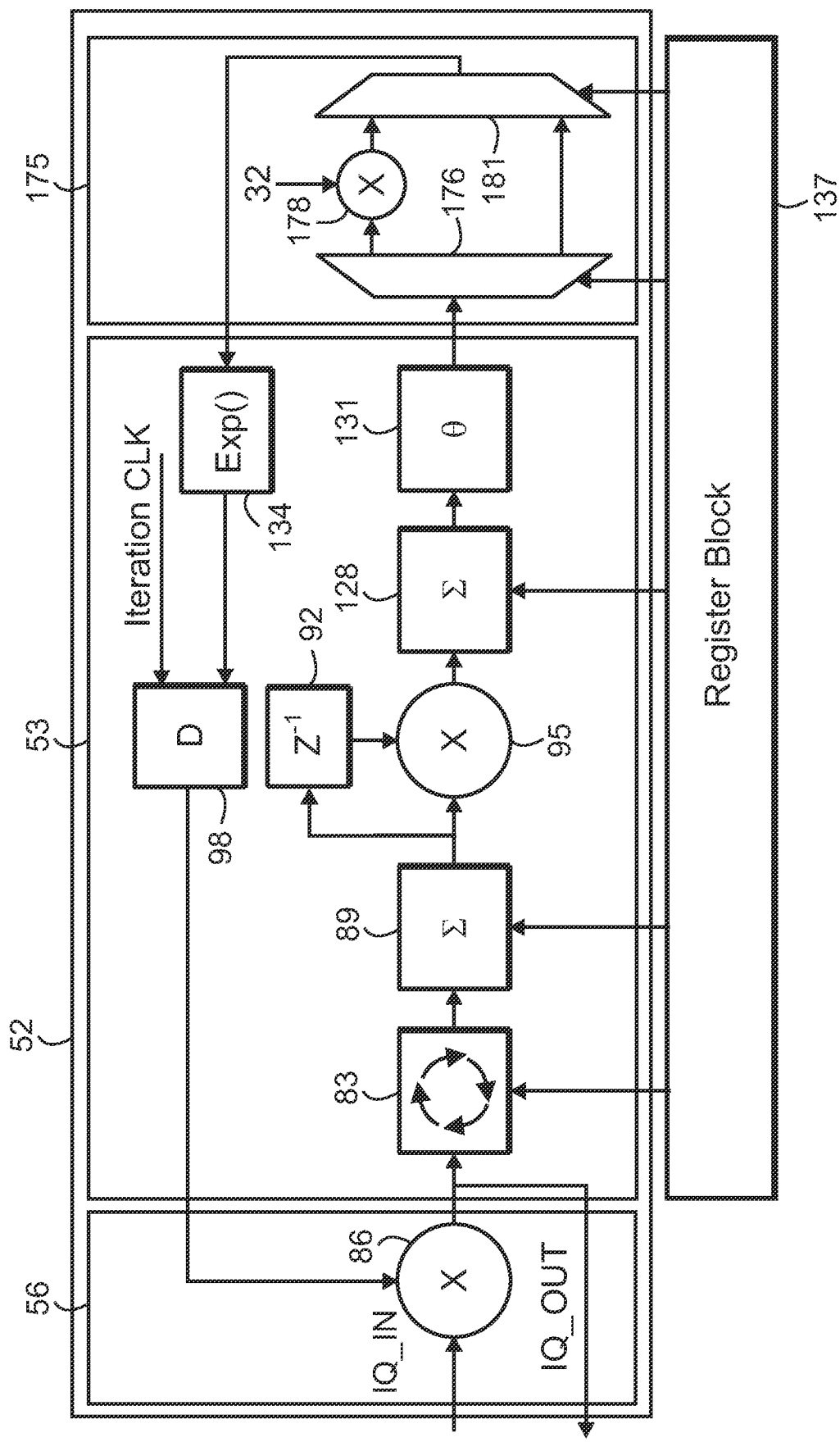
FIG. 11 shows a circuit arrangement for CFO correction according to an exemplary embodiment.

FIG. 11 shows a circuit arrangement for CFO correction according to an exemplary embodiment. More specifically, FIG. 11 shows details of the CFO correction circuit 52 in FIG. 10. Referring again to FIG. 11, the CFO removal circuit 56 is the same as that shown in FIG. 7.

Furthermore, the CFO estimation circuit 53 in FIG. 11 is similar to the CFO estimation circuit in FIG. 7. In the embodiment in FIG. 11, however, one branch or loop is used (rather than three in FIG. 7). More specifically, the embodiment in FIG. 11 uses the first branch shown in FIG. 7, with the averaging circuit 101 omitted.

In addition, the exponentiation circuit 134 is used like in FIG. 7. Unlike the embodiment in FIG. 7, the output of the CORDIC 131 in FIG. 11 drives an input of the PDR circuit 175.

The PDR circuit 175 includes a DeMUX 178 that receives the output of the CORDIC 131. In response to a control signal from the demodulator (not shown) provided via the register block 137, the DeMUX 176 provides its input signal either to a multiplier 178 or to a multiplexer (MUX) 181.

If the input signal of the DeMUX 176 is provided to the multiplier 178, then the multiplier 178 multiplies the frequency samples by 32, which denotes the number of chips per symbol. As persons of ordinary skill in the art will understand, however, the number of chips per symbol may in other embodiments differ from 32, depending on factors such as design and performance specifications, etc. Furthermore, multiplying by 32 assumes switching antennas for each symbol, thus every 32 chips in the case of the Zigbee example discussed above.

As another option, depending on the control signal from the register block 137, the DeMUX 176 provides its input signal to the MUX 181 without modification. In effect, the DeMUX circuit 176 determines whether to use unmodified frequency samples or use frequency samples that have been multiplied by the number of chips per symbol.

In response to a control signal from the demodulator (not shown) provided via the register block 137, the MUX 181 provides one of its input signals to the exponentiation circuit 134. As noted above, the exponentiation block 134 may be implemented using a CORDIC, as desired.

Figure 12:
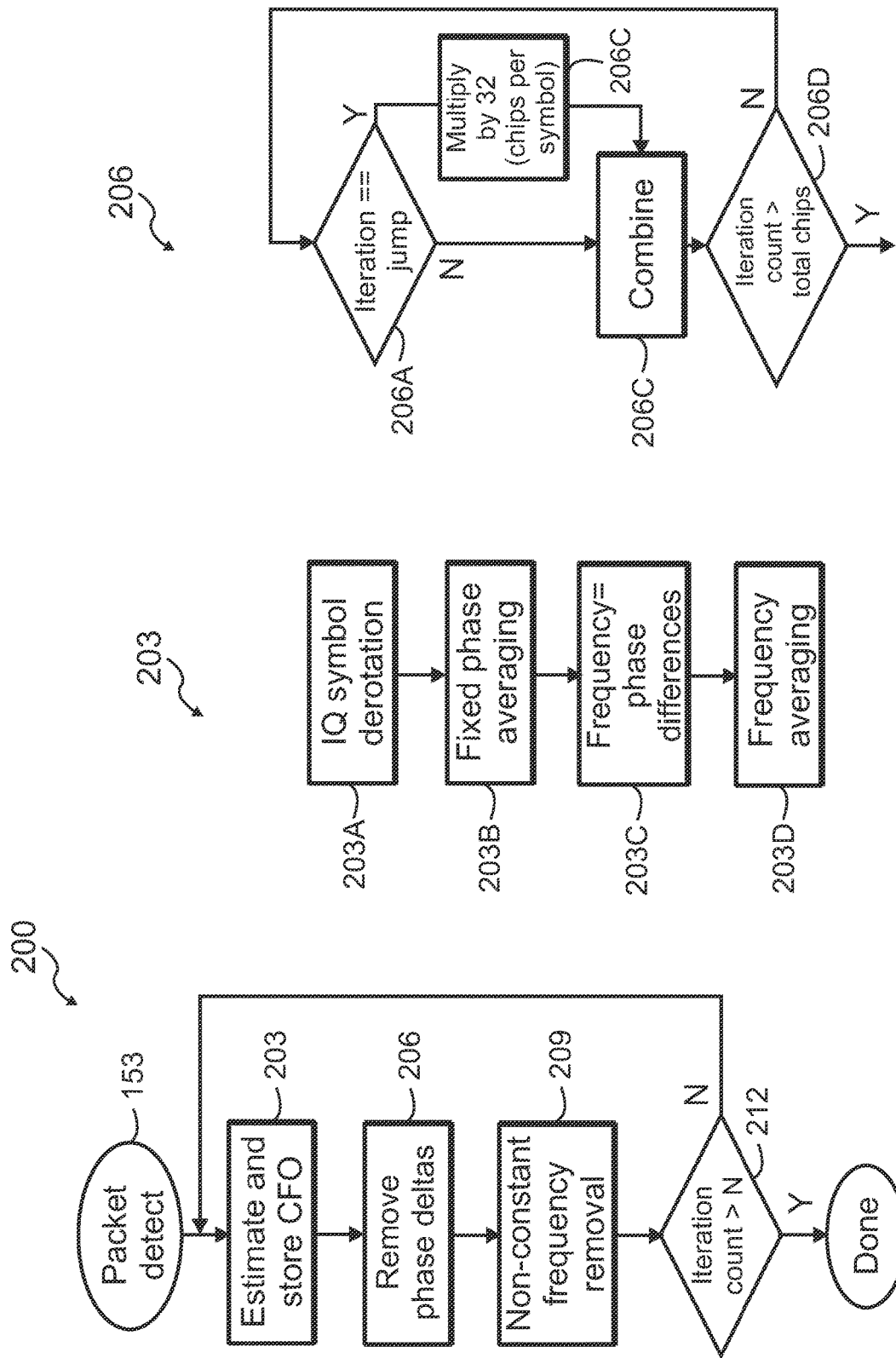
FIGS. 12A-12C show flow diagrams for a method of CFO correction according to an exemplary embodiment.

FIG. 12A-12C show flow diagrams for a method of CFO correction according to an exemplary embodiment. More specifically, FIGS. 12A-12C illustrate flow diagrams for CFO correction in the exemplary embodiments of FIGS. 10-11.

Referring to FIG. 12A, at 153, a packet is detected by the RF receiver (e.g., the receiver in FIG. 10). At 203, the CFO is estimated and stored (e.g., CFO1 in FIG. 9). At 206, the phase differences are removed. At 209, non-constant frequency removal is performed. At 212, a check is made whether the iteration count exceeds a threshold, N, where N denotes a positive integer. If not, control returns to 203. If the count exceeds N, however, CFO correction concludes.

FIG. 12B illustrates details of estimating and storing CFO at 203 in FIG. 12A. Referring to FIG. 12B, at 203A, IQ symbol derotation is performed. At 203B, fixed phase averaging is performed. At 203C, frequency is derived from the phase samples. At 203D, frequency averaging is performed. FIG. 12C illustrates details of removing phase differences at 206 in FIG. 12A.

At 206A, a check is made whether the iteration count equals the chip number for each antenna switch time, i.e., (32) in the case of switching for every symbol for the Zigbee example. If so, the frequency samples are multiplied by the number of chips per symbol (e.g., 32). If not, control passes to 206C, where the results are combined. At 206D, a check is made whether the iteration count exceeds the number of total chips. If yes, the process continues (e.g., to 209 in FIG. 12A), otherwise control returns to 206A.

Figure 13:
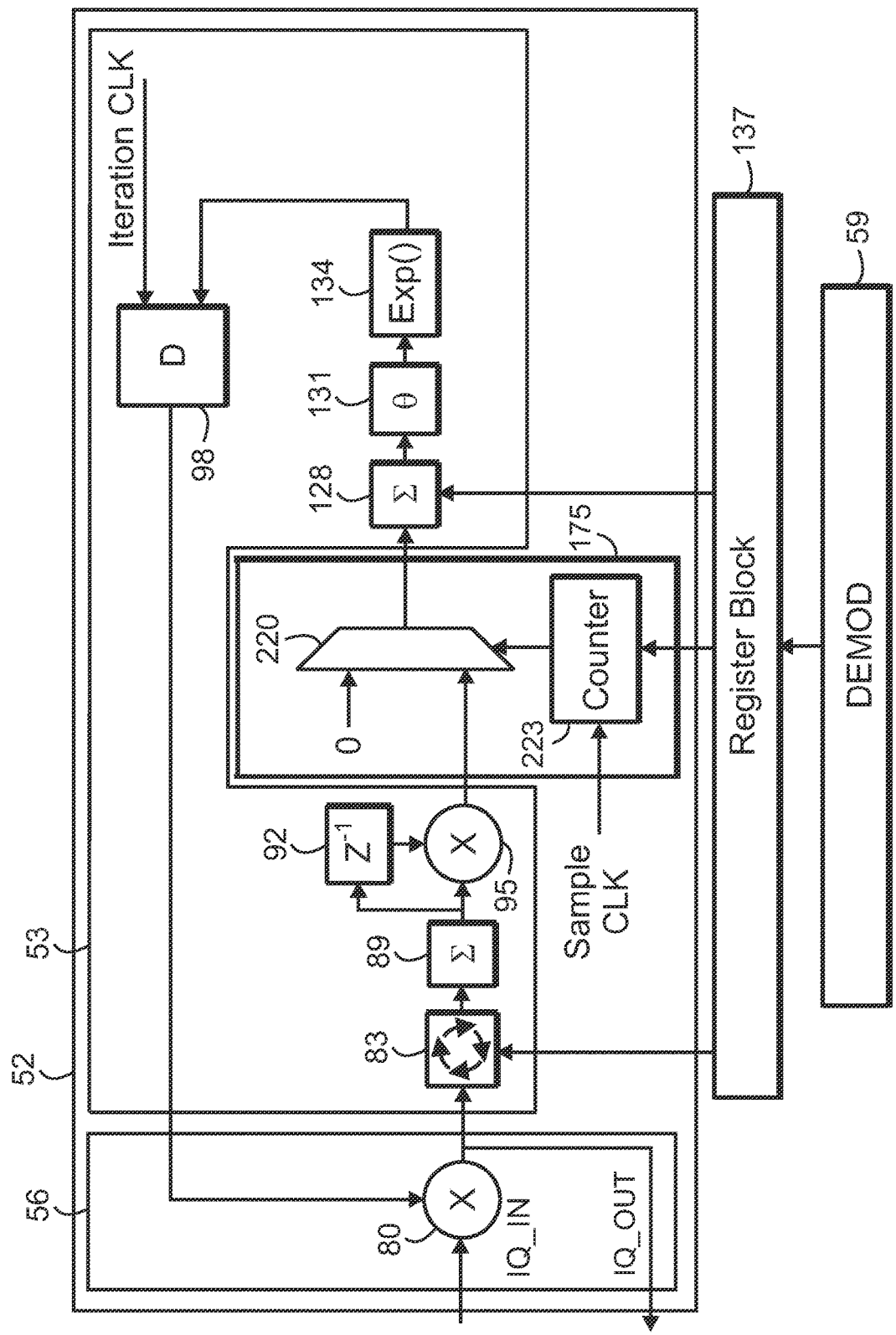
FIG. 13 shows a circuit arrangement for CFO correction according to an exemplary embodiment.

The RF receiver 20 shown in FIG. 10 may be used with CFO correction circuits 52 other than the exemplary embodiment shown in FIG. 11. FIG. 13 shows a block diagram of such an alternative CFO correction circuit 52. The CFO removal circuit in FIG. 13 is the same as shown in FIG. 11, and described above.

The CFO estimation circuit 53 is similar to the counterpart circuit show in FIG. 11, but in the embodiment in FIG. 13, the PDR circuit 175 (described below in detail) is coupled between the output of the multiplier 95 and the input of the averaging circuit 128. More specifically, the output of the multiplier 95 feeds an input of the PDR circuit 175, and the output of the PDR circuit 175 feeds the input of the averaging circuit 128.

Although it operates on frequency samples, functionally, the PDR circuit 175 performs phase difference removal. Phase difference removal includes zeroing (via the binary 0 input to the MUX 220) some frequency samples. The PDR circuit 175 includes a counter 223 and a MUX 220. One input of the MUX 220 receives a binary logic 0 level. The other input of the MUX 220 receives the output of the multiplier 95.

The counter 223 provides the select or control signal of the MUX 220. More specifically, under control of the demodulator 59, via the register block 137, the counter 223 counts in response to a clock signal labeled "Sample CLK." The counter 223 is programmed by the register block 134 because the position of the samples to zero out (set to zero by virtue of the binary 0 input to the MUX 220) depends on the position of the antenna switch (e.g., the switch 29 in FIG. 10) and the current iteration number (the number of times information has been processed via the loop in the CFO correction circuit 52).

Essentially, the PDR circuit 175 zeros out (by virtue of the binary 0 applied to an input of the MUX 220) some frequency samples. More specifically, via the select signal from the demodulator 59 (provided via the register block 134), the MUX 220 provides a binary 0 as its output when there is a "jump" or discontinuity. The counter 223 is programmed by the register block 137 because the position of the samples to zero out depends on the position of the antenna switches, and the iteration number (how many cycles of the "Iteration CLK" signal have been applied to the latch 98). The demodulator 59 provides both of those quantities to the register block 137.

Figure 14:
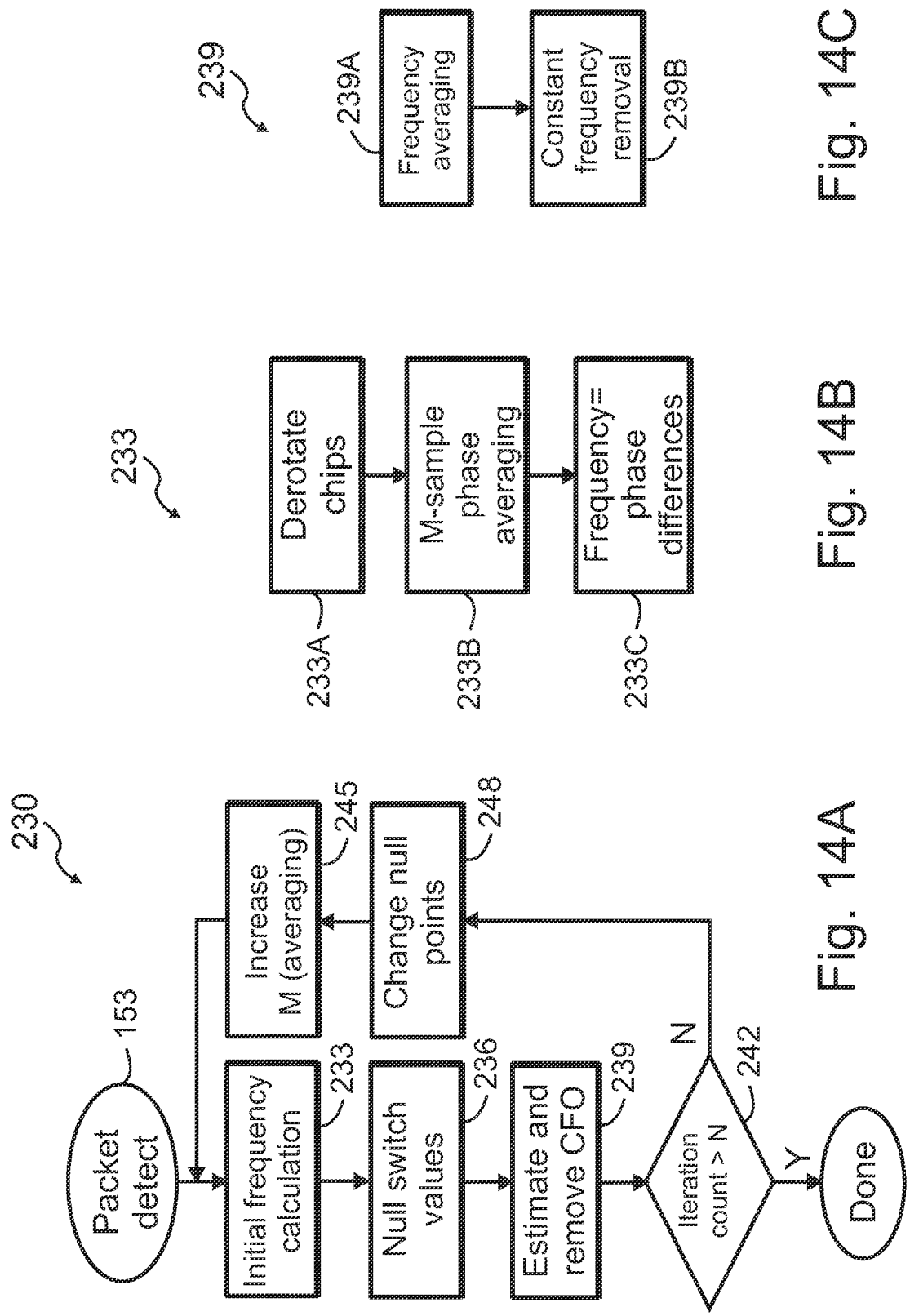
FIGS. 14A-14C show flow diagrams for a method of CFO correction according to an exemplary embodiment.

FIG. 14A-14C show flow diagrams for a method of CFO correction according to an exemplary embodiment. More specifically, FIGS. 14A-14C illustrate flow diagrams for CFO correction in the exemplary embodiments of FIGS. 10 and 13.

Referring to FIG. 14A, at 153, a packet is detected by the RF receiver (e.g., the receiver in FIG. 10). At 223, an initial frequency calculation is made. At 236, antenna switch values are nulled (set to 0, as described above). More specifically, differential phase values (frequency values) are calculated and values corresponding to transitions are nulled. At 239, the CFO is estimated and stored.

At 242, a check is made whether the iteration count exceeds a threshold, N, where N denotes a positive integer. If so, CFO correction concludes. Otherwise, control passes to 248, where the null points are changed. Thereafter, at 245, the number of averaging operations, M, is increased, where M denotes a positive integer, and control returns to 233.

FIG. 14B illustrates details of the initial frequency calculation performed at 233 in FIG. 14A. Referring to FIG. 14B, at 233A, the chips are derotated. At 233B, an M-sample phase averaging operation is performed. At 233C, frequency values are derived from the phase samples.

FIG. 14C illustrates details of the CFO estimation and removal performed at 239 in FIG. 14A. At 239A, frequency averaging is performed. At 239B, constant frequency removal is performed.

Figure 15:
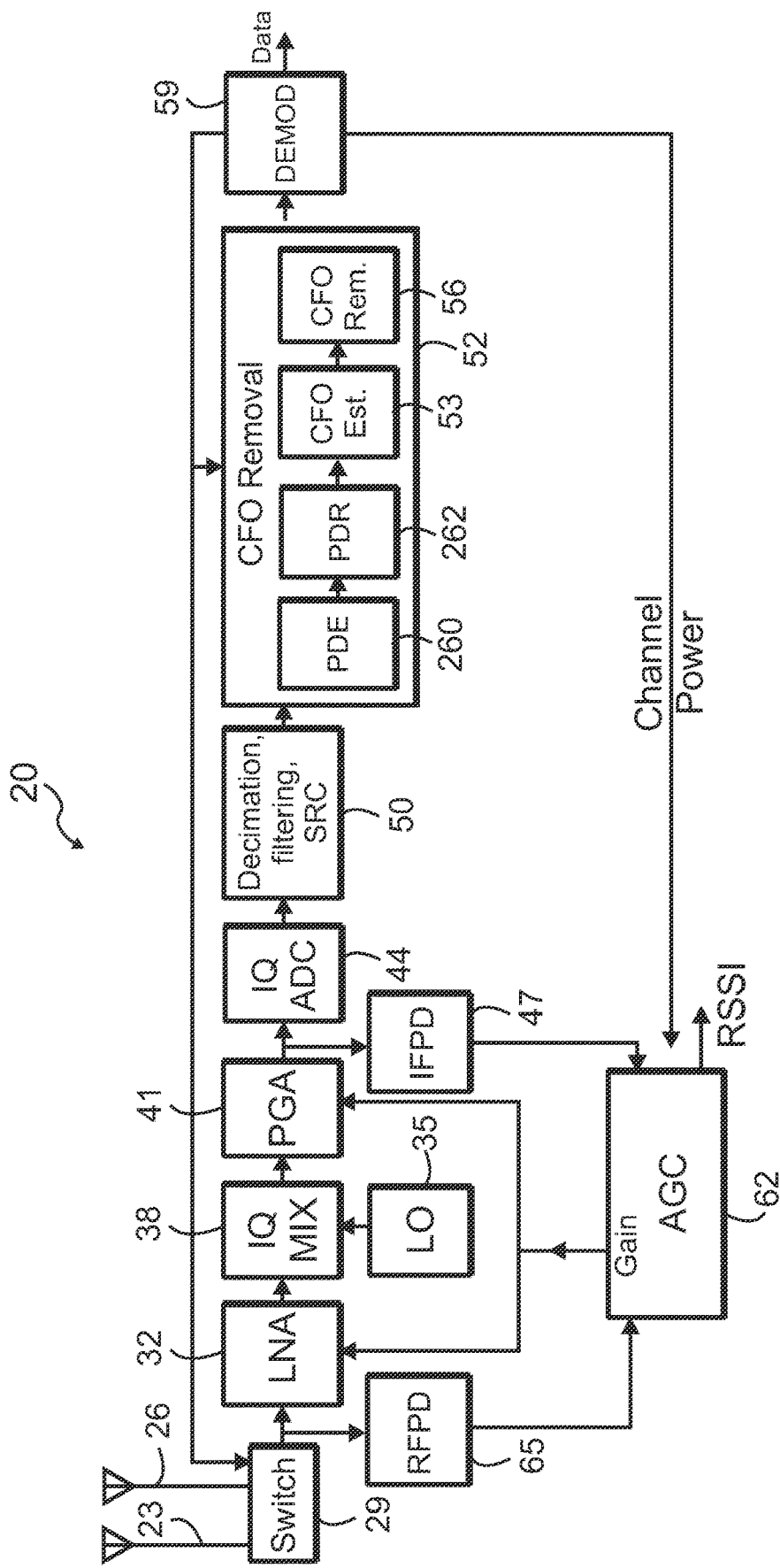
FIG. 15 shows a circuit arrangement for an RF receiver according to an exemplary embodiment.

FIG. 15 shows a circuit arrangement for an RF receiver 20 according to an exemplary embodiment. The RF receiver 20 in FIG. 15 is similar to the RF receiver 20 in FIG. 10, but differs in the CFO correction circuit 52. Referring to FIG. 15, the CFO correction circuit includes the CFO estimation circuit 53, the CFO removal circuit 56, the PDR circuit 262, and a phase delta estimation or phase difference estimation (PDE) circuit 260.

Figure 16:
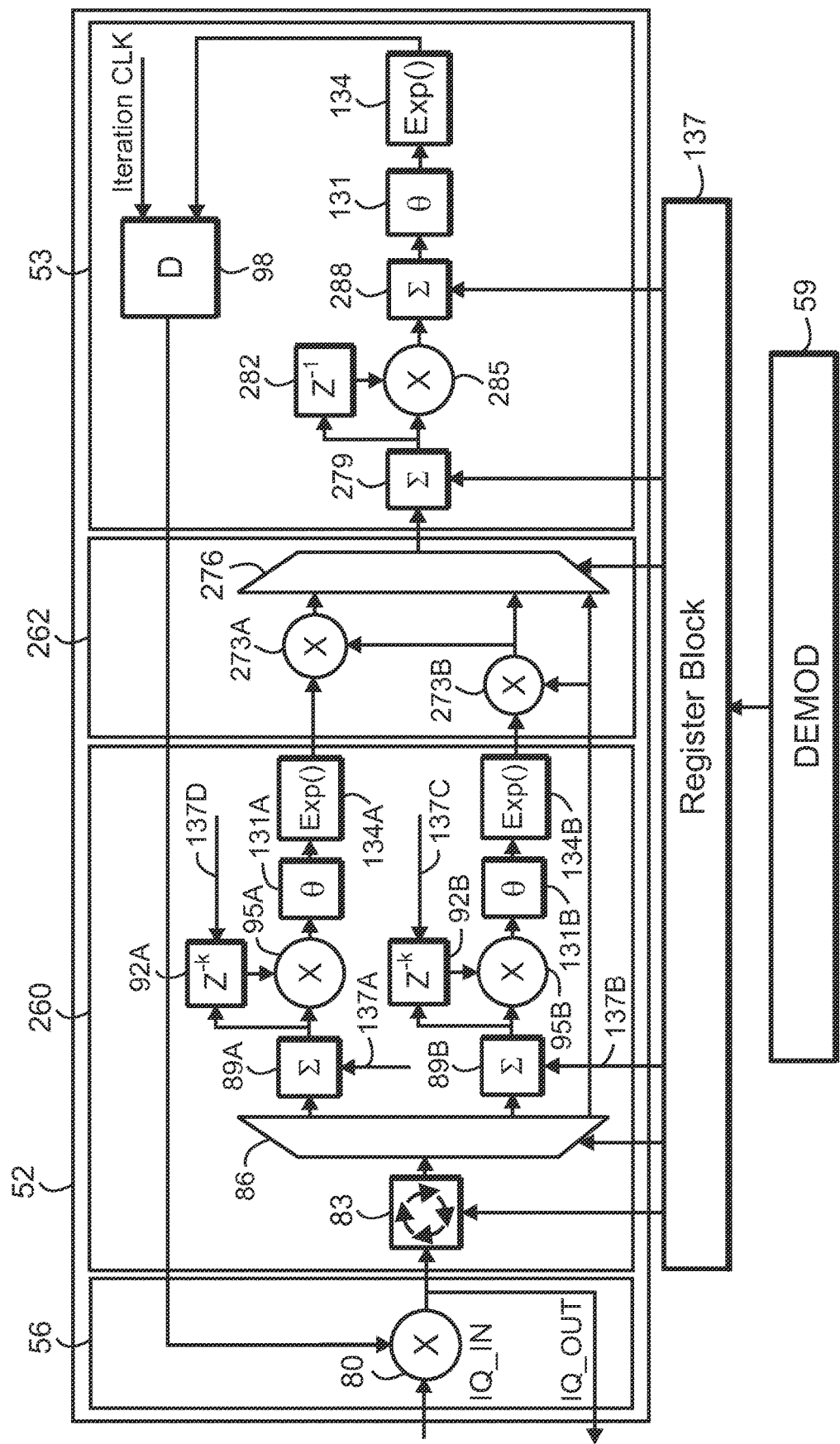
FIG. 16 shows a circuit arrangement for CFO correction according to an exemplary embodiment.

FIG. 16 shows a circuit arrangement for CFO correction according to an exemplary embodiment. More specifically, FIG. 16 shows details of the CFO correction circuit 52 in FIG. 15. Referring again to FIG. 16, the CFO removal circuit 56 is the same as that shown in FIG. 7.

Furthermore, the CFO estimation circuit 53 in FIG. 16 is similar to the CFO estimation circuit in FIG. 7. In the embodiment in FIG. 16, however, one branch or loop is used (rather than three in FIG. 7). More specifically, the embodiment in FIG. 16 uses the first branch shown in FIG. 7, with the averaging circuit 101, the derotator 83, and the DeMUX 86 omitted. Thus, the CFO estimation circuit 53 in FIG. 16 includes the phase averaging circuit 279, phase to frequency converter circuit (including the multiplier 285 and the delay circuit 282), the frequency averaging circuit 288, the CORDIC 131, and the exponentiation circuit 134.

Referring again to FIG. 16, the PDE circuit 260 is similar to the CFO estimation circuit 53, but with the following differences. First, no second averaging circuit (averaging circuit 288 in the CFO estimation circuit 53) is used. Second, instead of one branch or loop in the CFO estimation circuit 53, the PDE circuit 260 uses two branches or loops, i.e., two circuit branches that operate on and modify the output of the derotator 83, as provided by the MUX 86 (in response to control signals from the register block 137), and provide the results to the PDR circuit 262. The MUX 86 also provides the output of the derotator 83 to the PDR circuit 262 (in response to control signals from the register block 137). The first branch includes the averaging circuit 89A, the multiplier 95A, the delay circuit 92A, the CORDIC 131A, and the exponentiation circuit 134A. The second branch includes the averaging circuit 89B, the multiplier 95B, the delay circuit 92B, the CORDIC 131B, and the exponentiation circuit 134B.

Third, the DeMUX 86 receives the output of the derotator 83, and under the control of the demodulator 59 (via the register block 134) provides that output to one of the two branches described above. The derotator 83 receives its input from the output of the multiplier 80. Fourth, the phase to frequency converters in each of the first and second branches operate on k samples instead of a fixed sample (hence the use of the notation Z-k for the delay circuits 92A and 92B) in response to the control signals 137D and 137C (provided by the demodulator 59 via the register block 137), respectively.

The PDR circuit 262 is similar to the CFO removal circuit 56, with the following differences. First, the PDR circuit 262 uses a MUX 276 that under the control of the demodulator 59 (via the register block 134) provides one of its three input signals to the CFO estimation circuit 53.

Second, the PDR circuit 262 two multipliers, 273A and 273B. The multiplier 273A multiplies the output of the exponentiation circuit 134A with the output of the multiplier 273B, and provides the resulting output to the MUX 276. The multiplier 273B multiples the output of the exponentiation circuit 134B with the output of the derotator 83 (as provided by the DeMUX 86) and provides the resulting output to the MUX 276 as a second input.

Finally, the output of the derotator 83 (as provided by the DeMUX 86) drives a third input of the MUX 276. The three inputs of the MUX 276 correspond to three intervals, the first corresponding to the output of the derotator 83 without any modification, the second having been rotated once (the output of the multiplier 273B), and the third having been rotated twice (the output of the multiplier 273A). As persons of ordinary skill in the art will understand, other numbers of circuit branches may be used, depending on factors such as design and performance specifications, cost, target performance, target markets, etc.

Figures 17A, 17B, 17C:
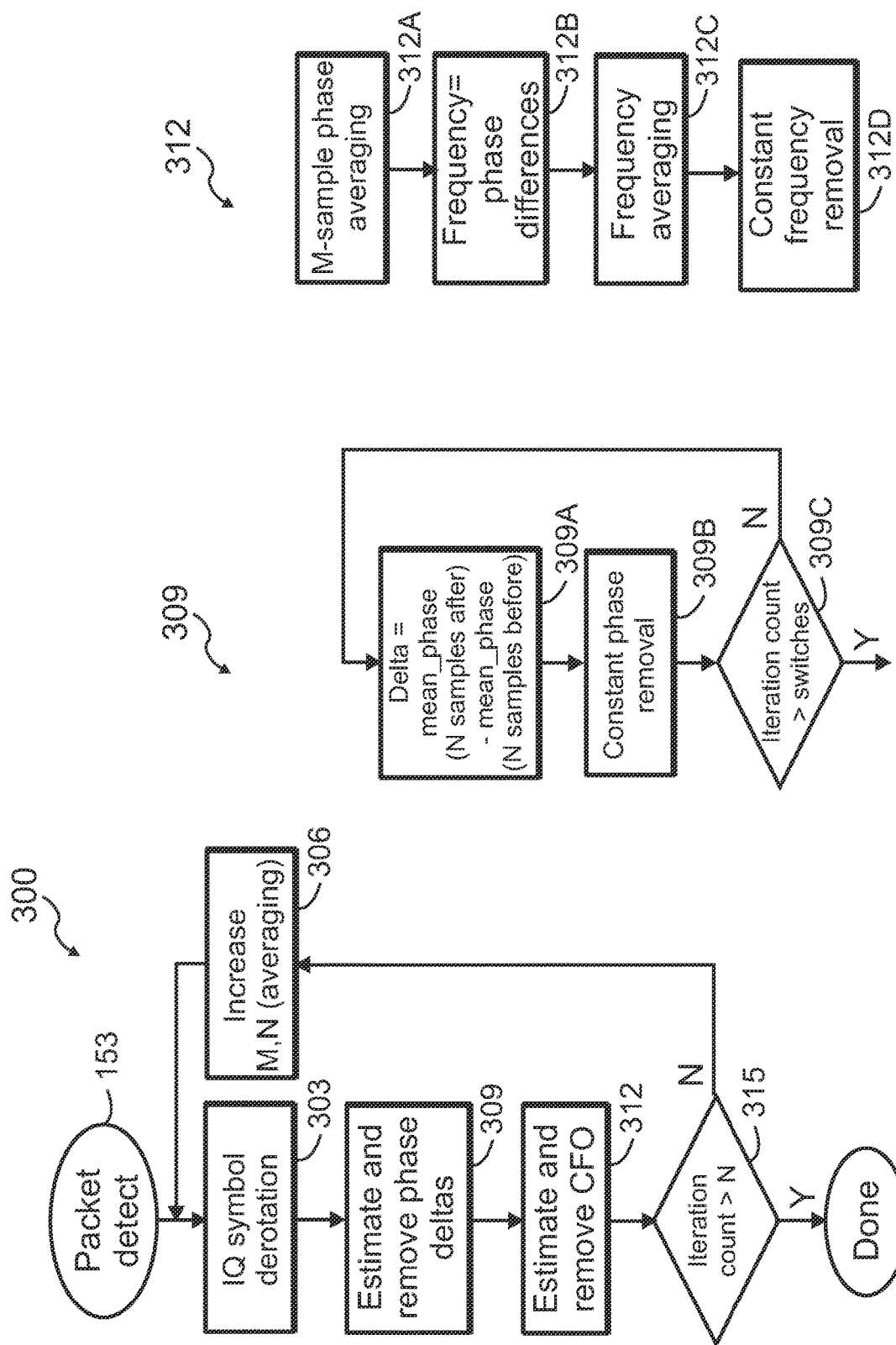
FIGS. 17A-17C show flow diagrams for a method of CFO correction according to an exemplary embodiment.

FIG. 17A-17C show flow diagrams for a method of CFO correction according to an exemplary embodiment. More specifically, FIGS. 17A-17C illustrate flow diagrams for CFO correction in the exemplary embodiments of FIGS. 15-16.

Referring to FIG. 17A, at 153, a packet is detected by the RF receiver (e.g., the receiver in FIG. 15). At 303, IQ symbol derotation is performed. At 309, phase differences are estimated and removed. At 312, the CFO is estimated and stored.

At 315, a check is made whether the iteration count exceeds a threshold, N, where N denotes a positive integer. If so, CFO correction concludes. Otherwise, control passes to 306, where the number of averaging operations (M and N) are increased, and control passes to 303.

FIG. 17B illustrates details of the estimation and removal of phase differences performed at 309 in FIG. 17A. Referring to FIG. 17B, at 309A, the phase difference is calculated as the mean (average) phase of N samples after the antenna switch point minus the mean (or average) phase of N samples before the antenna switch point.

At 309B, a constant phase removal operation is performed. At 309C, a check is performed whether the iteration count exceeds the number of antenna switches. If so, control passes to 312 (see FIG. 17A), otherwise, control returns to 309A (i.e., another iteration is performed).

FIG. 17C illustrates details of the estimation and removal of the CFO performed at 312 in FIG. 17A. Referring to FIG. 17B, at 312A, an M-sample phase averaging is performed. At 312B, frequency values are derived from the averaged phase values. At 312C, an averaging operation is performed on the frequency values. At 312D, constant frequency removal is performed.

Figure 18:
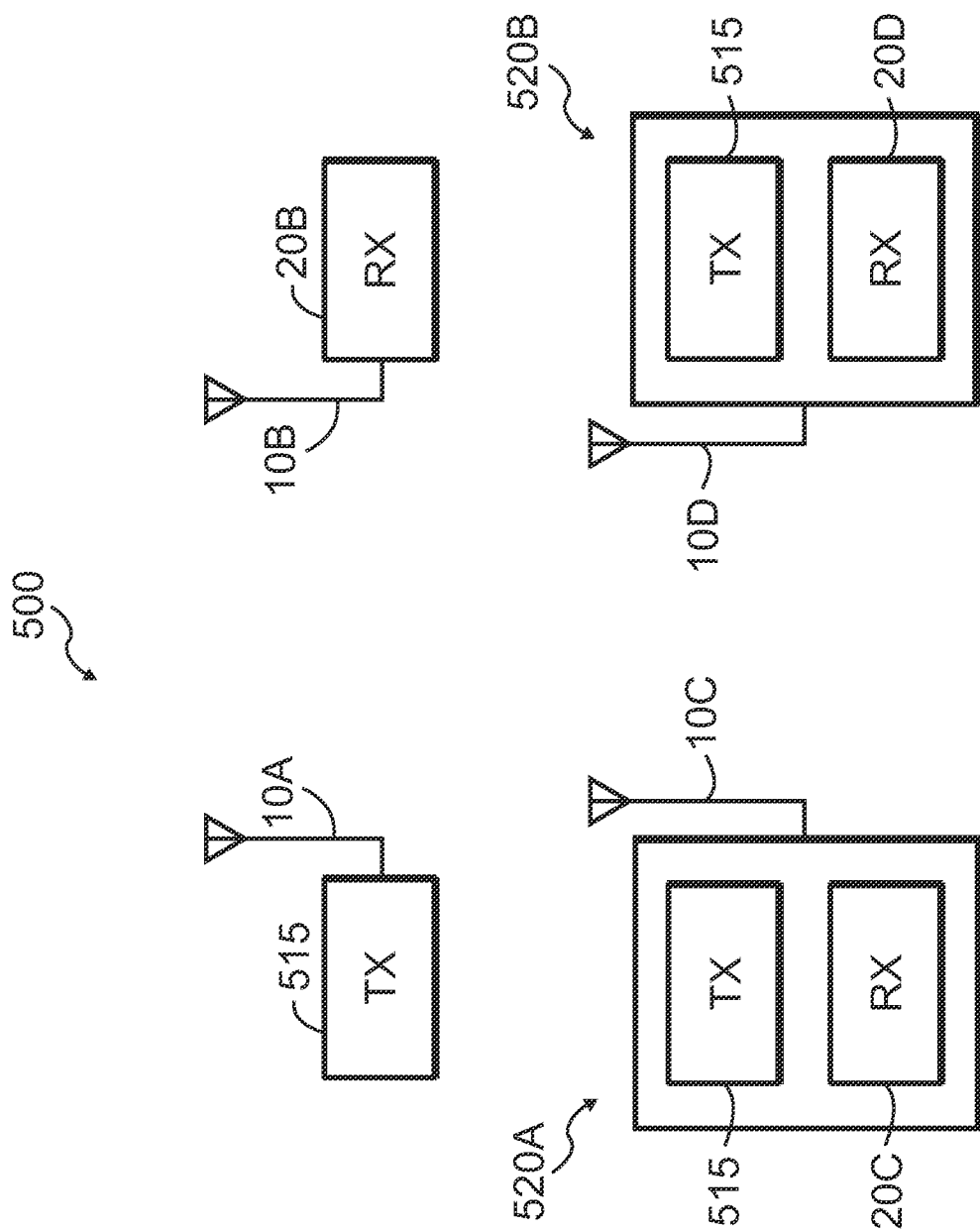
FIG. 18 shows a system for radio communication according to an exemplary embodiment.

Receivers according to exemplary embodiments may be used in a variety of communication arrangements, systems, sub-systems, networks, etc., as desired. FIG. 18 shows a system 500 for radio communication according to an exemplary embodiment. The system includes RF receivers 5, as described above.

System 500 includes a transmitter 515, coupled to antenna 10A. Via antenna 10A, transmitter 515 transmits RF signals. The RF signals may be received by receiver 20B via antenna 10B. In addition, or alternatively, transceiver 520A and/or transceiver 520B might receive (via receivers 20C and 20D, respectively) the transmitted RF signals.

In addition to receive capability, transceiver 520A and transceiver 520B can also transmit RF signals. The transmitted RF signals might be received by receiver 20, either in the stand-alone receiver (20B), or via the receiver circuitry of the non-transmitting transceiver (20C or 20D).

Other systems or sub-systems with varying configuration and/or capabilities are also contemplated. For example, in some exemplary embodiments, two or more transceivers (e.g., transceiver 520A and transceiver 520B) might form a network, such as an ad-hoc or mesh network. As another example, in some exemplary embodiments, transceiver 520A and transceiver 520B might form part of a network, for example, in conjunction with transmitter 515.

Figure 19:
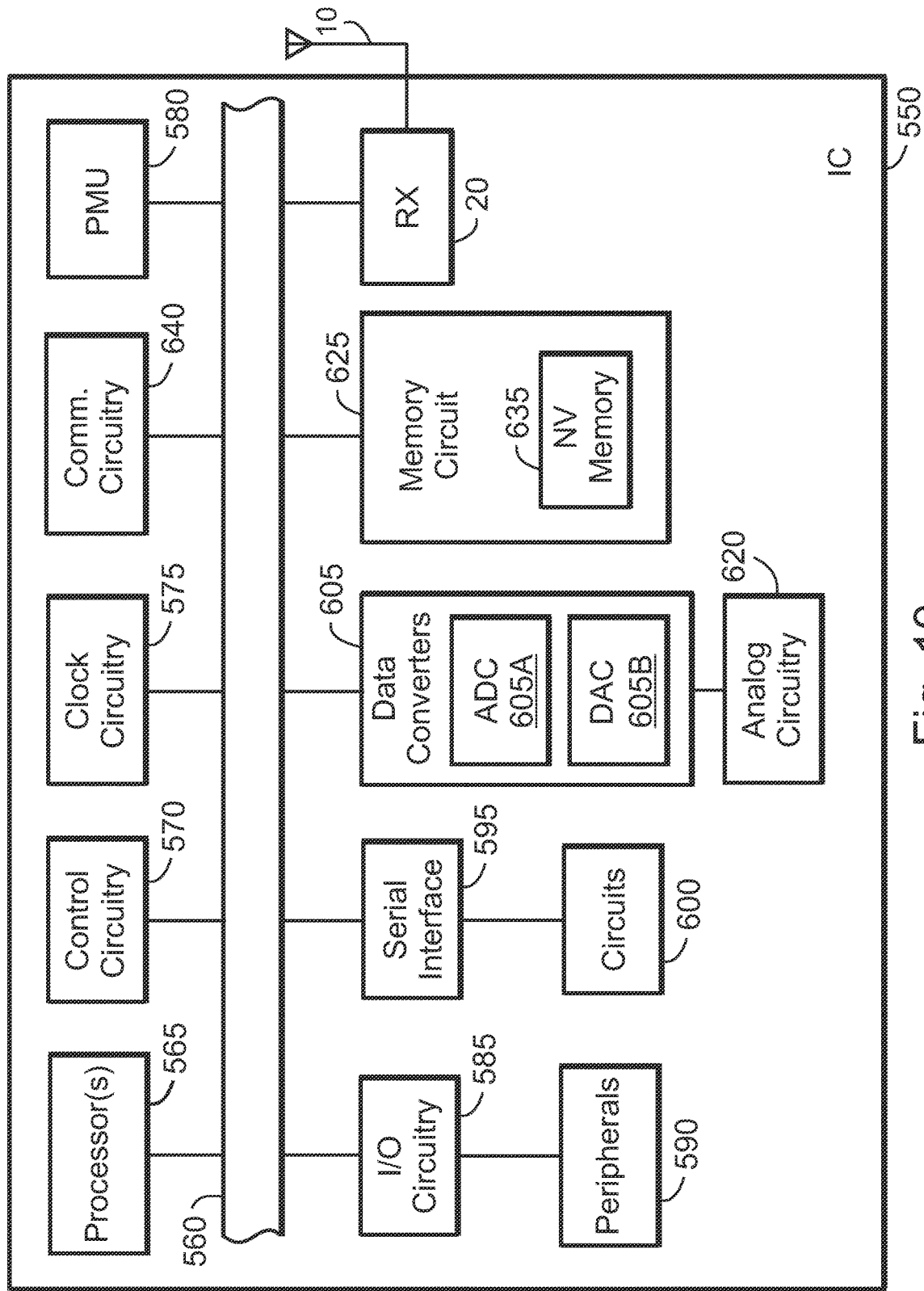
FIG. 19 shows a circuit arrangement for an IC, including an RF receiver, according to an exemplary embodiment.
Figure 20:
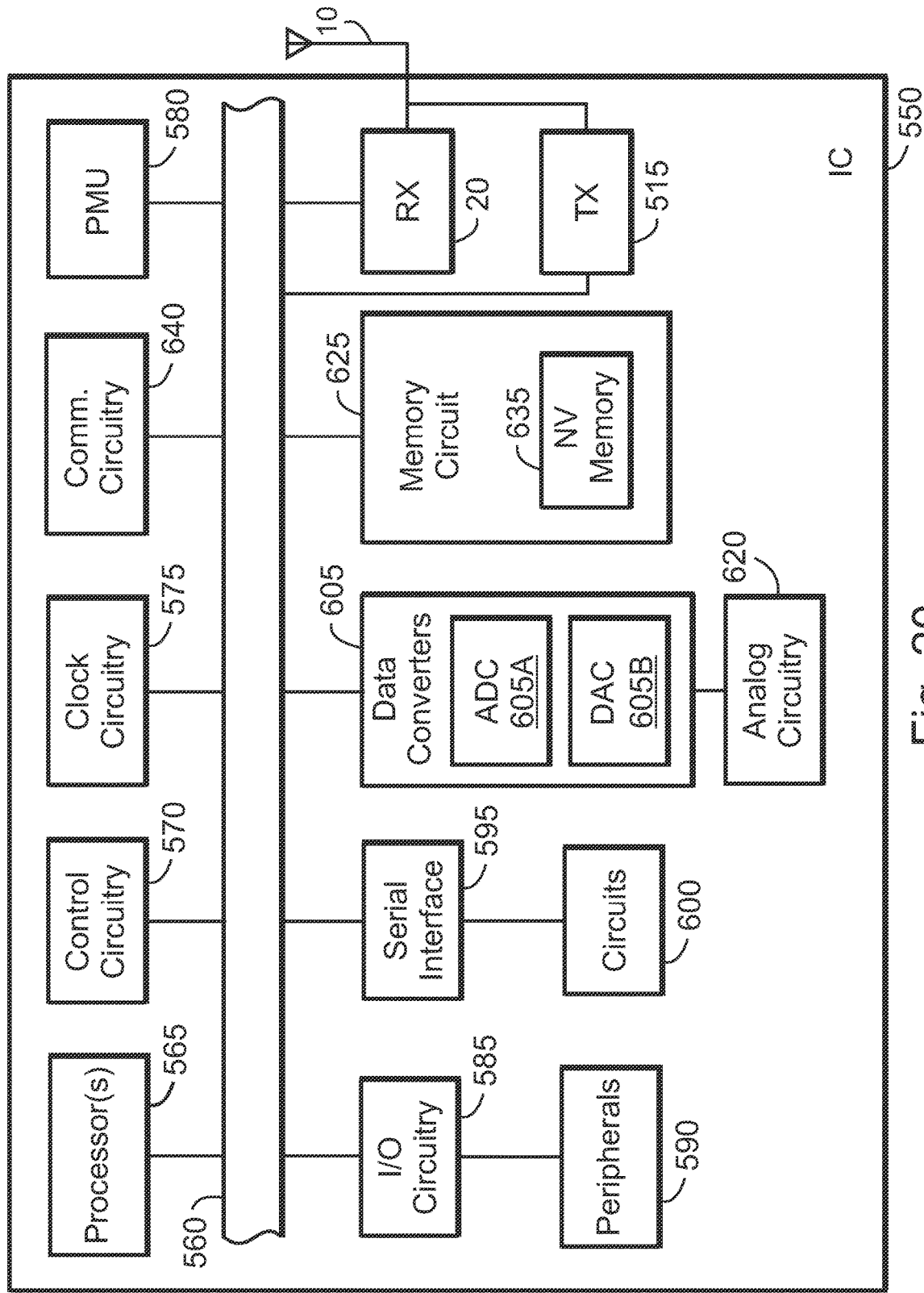
FIG. 20 shows a circuit arrangement for an IC, including an RF receiver and an RF transmitter, according to an exemplary embodiment.

RF receivers, such as RF receiver 20 described above, may be used in a variety of circuits, blocks, subsystems, and/or systems. For example, in some embodiments, such RF receivers may be integrated in an IC, such as a microcontroller unit (MCU). FIG. 19 shows a block diagram of an IC 550 according to an exemplary embodiment. FIG. 20 is similar to the embodiment of FIG. 19, and shows an IC 550 that, in addition to the RF receiver 5, also includes RF transmitter 515. Thus, the embodiment in FIG. 20 has RF transceiver capability.

Referring to FIG. 19, IC 550 constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as RF receiver 5 or various blocks, circuits, or components of it, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to the operation of RF receiver 20, such as configuration information for various blocks, circuits, components, etc. of RF receiver 20.

RF receiver 20 couples to link 560. Through link 560, RF receiver 20 may receive control and/or status information from one or more blocks in IC 550. Conversely, through link 560, RF receiver 20 may provide information, such as control and/or status information, and information received through RF signals via antenna 10.

Various circuits and blocks including digital and/or mixed-signal circuitry described above and used in exemplary embodiments may be implemented in a variety of ways and using a variety of circuit elements or blocks. For example, the ADC 35, decimation, filtering, and SRC (DFS) circuit 50, the CFO correction circuitry 52 (including the CFO estimation circuit, the CFO removal circuit, the PDE circuit, and the PDR circuit), the demodulator 59, etc. may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Various circuits and blocks including analog circuitry described above and used in exemplary embodiments may be implemented in a variety of ways and using a variety of circuit elements or blocks. For example, the LNA 32, the mixer 38, the LO 35, and the PGA 41 may generally be implemented using analog circuitry. The analog circuitry may include bias circuits, decoupling circuits, coupling circuits, supply circuits, current mirrors, current and/or voltage sources, filters, amplifiers, converters, signal processing circuits (e.g., multipliers), sensors or detectors, transducers, discrete components (transistors, diodes, resistors, capacitors, inductors), analog MUXs, and the like, as desired, and as persons of ordinary skill in the art will understand. In addition, digital circuitry or mixed-signal circuitry or both may be included. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a radio-frequency (RF) receiver for receiving an RF signal using a plurality of antennas, the RF receiver comprising:
a demodulator to provide a switch signal to cause the RF receiver to use an antenna in the plurality of antennas in an antenna diversity configuration; and
a carrier frequency offset (CFO) correction circuit that estimates and removes a carrier frequency offset, the CFO correction circuit comprising a CFO estimation circuit comprising a demultiplexer (DeMUX) coupled to a plurality of circuit branches, wherein each of the plurality of circuit branches comprises a first averaging circuit, a phase to frequency converter circuit, and a second averaging circuit.

2. The apparatus according to claim 1, wherein the CFO correction circuit comprises a CFO removal circuit.

3. The apparatus according to claim 2, wherein the CFO removal circuit comprises a multiplier that multiplies in-phase (I) and quadrature (Q) input signals with an output of the CFO estimation circuit.

4. The apparatus according to claim 2, wherein the CFO estimation circuit includes a derotator coupled to a first averaging circuit, a phase to frequency converter circuit coupled to the first averaging circuit, a second averaging circuit coupled to the phase to frequency converter circuit, and a Coordinate Rotation Digital Computer (Cordic) coupled to the second averaging circuit.

5. The apparatus according to claim 2, wherein the CFO correction circuit comprises a phase difference removal (PDR) circuit coupled to an output of a Coordinate Rotation Digital Computer (Cordic).

6. The apparatus according to claim 5, wherein the PDR circuit comprises a demultiplexer (DeMUX) coupled to receive the output of the Cordic, a multiplier coupled to an output of the DeMUX, and a multiplexer (MUX) coupled to the multiplier and to the DeMUX.

7. The apparatus according to claim 6, wherein an output of the MUX drives an input of an exponentiation circuit in the CFO estimation circuit.

8. The apparatus according to claim 1, wherein the CFO estimation circuit further comprises a third averaging circuit, a Coordinate Rotation Digital Computer (Cordic), and an exponentiation circuit.

9. An apparatus, comprising:
a radio-frequency (RF) receiver for receiving an RF signal using a plurality of antennas, the RF receiver comprising:
a demodulator to provide a switch signal to cause the RF receiver to use an antenna in the plurality of antennas in an antenna diversity configuration; and
a carrier-frequency-offset (CFO) estimation circuit to use the switch signal to provide an estimation of a carrier frequency offset;
a phase difference removal (PDR) circuit coupled to the CFO estimation circuit, wherein the PDR circuit comprises a multiplexer (MUX) and a counter; and
a CFO removal circuit, coupled to the CFO estimation circuit, that uses the estimation of the carrier frequency offset to remove the carrier frequency offset.

10. The apparatus according to claim 9, wherein the CFO removal circuit comprises a multiplier that multiplies in-phase (I) and quadrature (Q) input signals with an output of the CFO estimation circuit.

11. The apparatus according to claim 9, wherein the CFO estimation circuit includes a derotator, a first averaging circuit, a phase to frequency converter circuit, a multiplier, a second averaging circuit, a Coordinate Rotation Digital Computer (Cordic), and an exponentiation circuit.

12. The apparatus according to claim 11, wherein the MUX is coupled to the multiplier, and the counter provides a select signal to the MUX, wherein in response to the select signal the MUX provides to the second averaging circuit either a binary zero or an output of the multiplier.

13. The apparatus according to claim 11, wherein the CFO estimation circuit further comprises a third averaging circuit.

14. A method of correcting a carrier frequency offset (CFO) in a radio-frequency (RF) receiver using a plurality of antennas, the method comprising:
using a demodulator to provide a switch signal to cause the RF receiver to use an antenna in the plurality of antennas in an antenna diversity configuration; and
using a CFO correction circuit to estimate and remove the carrier frequency offset, wherein using the CFO correction circuit comprises using a phase difference removal (PDR) circuit by selectively multiplying an output of a CFO estimation circuit with a number of chips per symbol of a received RF signal.

15. The method according to claim 14, wherein using the CFO correction circuit to estimate and remove the carrier frequency offset further comprises using a CFO removal circuit.

16. The method according to claim 15, wherein using the CFO removal circuit further comprises multiplying in-phase (I) and quadrature (Q) input signals with an output of the CFO estimation circuit.

17. The method according to claim 15, wherein using the CFO estimation circuit comprises estimating and storing CFO values, and averaging the CFO values.

18. The method according to claim 14, wherein the CFO estimation circuit includes a demultiplexer (DeMUX) coupled to a plurality of circuit branches, wherein each of the plurality of circuit branches comprises a first averaging circuit, a phase to frequency converter circuit, and a second averaging circuit.

19. The method according to claim 18, wherein the CFO estimation circuit further comprises a third averaging circuit, a Coordinate Rotation Digital Computer (Cordic), and an exponentiation circuit.

20. The method according to claim 14, wherein the CFO correction circuit comprises a phase difference removal (PDR) circuit coupled to an output of a Coordinate Rotation Digital Computer (Cordic).

\* \* \* \* \*